United States Patent
Jalkanen et al.

(10) Patent No.: US 11,064,427 B2
(45) Date of Patent: Jul. 13, 2021

(54) SELECTION OF A MOBILE COMMUNICATION NETWORK SERVICE

(71) Applicant: Telia Company AB, Solna (SE)

(72) Inventors: Tero Jalkanen, Tuusula (FI); Tomi Sarajisto, Helsinki (FI)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 16/595,761

(22) Filed: Oct. 8, 2019

(65) Prior Publication Data
US 2020/0120588 A1    Apr. 16, 2020

(30) Foreign Application Priority Data
Oct. 10, 2018  (EP) ...................................... 8199483

(51) Int. Cl.
H04W 48/18        (2009.01)
H04W 60/04        (2009.01)

(52) U.S. Cl.
CPC ........... *H04W 48/18* (2013.01); *H04W 60/04* (2013.01)

(58) Field of Classification Search
CPC .............................. H04W 60/04; H04W 48/18
USPC ..................................................... 455/435.3
See application file for complete search history.

(56) References Cited

U.S. PATENT DOCUMENTS

| 7,433,929 B2 * | 10/2008 | Guilford .............. H04W 48/18 455/435.2 |
| 9,979,562 B2 * | 5/2018 | Marquardt ............ H04W 76/10 |
| 2013/0060653 A1 * | 3/2013 | Sharkey ............... H04L 69/321 705/26.3 |
| 2016/0316512 A1 | 10/2016 | Dandra et al. |

FOREIGN PATENT DOCUMENTS

| WO | 2016/128055 A1 | 8/2016 | |
| WO | WO 2016/128055 A1 * | 8/2016 | ............ H04W 60/00 |

OTHER PUBLICATIONS

European Search Report, dated Dec. 11, 2018, from corresponding European patent application No. 18 19 9483.

* cited by examiner

*Primary Examiner* — William Nealon
(74) *Attorney, Agent, or Firm* — Nixon & Vanderhye (57) ABSTRACT

Disclosed is a method for selecting a mobile communication network service. In the method it is generated a signal associated with data indicating at least one service requirement to a first mobile communication network and a response indicating a service capability of the first mobile communication network is received. In response to a detection that the first mobile communication network is not capable of providing the at least one service requirement a signal is generated to at least one second mobile communication network. A response is received from the at least one second mobile communication network, and the at least one second mobile communication network is selected if the response indicates the service capability with respect to the at least one service requirement. Also disclosed is a terminal device and a computer program product.

15 Claims, 3 Drawing Sheets

SELECTION OF A MOBILE COMMUNICATION NETWORK SERVICE

TECHNICAL FIELD

The invention concerns in general the technical field of communication networks. More particularly, the invention concerns selection of a mobile communication service.

BACKGROUND

An increased complexity of modern communication networks originates, at least in part, from a plurality of different terminal devices but also from different functionalities offered by different communication networks to the terminal devices. Matching these two is not a straightforward task because a certain terminal device may be indicated to support some general concept, such as Internet of Things (IoT), but a certain communication network provides only a limited set of features needed by the terminal device in an optimal manner.

Typically, a feature set offered by the communication network in question is typically decided by a telecom operator running the communication network. For allowing a certain terminal device to attach to the service of a certain communication network the telecom operation may run its own acceptance test process performed to the terminal device. It may be defined that only those terminal devices are allowed to attach which match with the network configuration i.e. the feature set offered by the communication network. For example, if a telecom operator no longer offers short message service (SMS) for IoT, the terminal devices utilizing that are not allowed.

Furthermore, some other processes exist for checking a possibility of the terminal device to attach to the communication network. A further example may e.g. be so-called capability exchange in which certain application or service exchange configuration information, but they are limited to a certain application or to a certain service only. Thus, such an arrangement is not applicable for the purpose of the terminal device trying to figure out whether the communication network can offer the necessary capabilities nor for the purpose of the communication network trying to discover if the terminal device should be allowed or not to attach the communication network.

Generally speaking the existing solutions introduced in the area have several drawbacks. It is either so that manufacturers of the terminal devices have to either modify the terminal devices according to supported features in a certain communication network or restrict the terminal devices to access communication networks of certain operators only. Moreover, even if some features may be updated to the terminal device through software updates in order to meet the communication network features, there is no way to indicate the update to the communication networks in a common way, which also cause problems for the users.

Hence, there is need to develop a procedure by means of which it may be determined if a terminal device shall attach to a certain network or not and how the terminal device may find a communication network to attach to.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a terminal device and a computer program product for selecting a mobile communication network service for a terminal device.

The objectives of the invention are reached by a method, a terminal device and a computer program product as defined by the respective independent claims.

According to a first aspect, a method for selecting a mobile communication network service for a terminal device is provided, the method comprises: generating, by the terminal device, a signal, in a context of a network attachment procedure, to a first mobile communication network, the signal is associated with data indicating at least one service requirement to the first mobile communication network; receiving, by the terminal device, a response from the first mobile communication network, the response indicating a service capability of the first mobile communication network at least with respect to the at least one service requirement indicated in the data associated to the signal; in response to a detection that the first mobile communication network is not capable of providing the at least one service requirement indicated in the signal generating, by the terminal device, a signal, in a context of a network attachment procedure, to at least one second mobile communication network, the signal is associated with data indicating the at least one service requirement to the at least one second mobile communication network; receiving, by the terminal device, a response from the at least one second mobile communication network, the response indicating a capability of the at least one second mobile communication network at least with respect to the at least one service requirement indicated in the data associated to the signal; and selecting, for attaching, the at least one second mobile communication network whose response is detected to indicate the service capability with respect to the at least one service requirement indicated in the data associated to the signal.

The signal into which data indicating the at least one service requirement is associated may be an attach request.

The association of data may be performed by one of the following: including the data in the signal, indicating in the signal a referral to the data. The data may be included in the signal into an extension of a UE-CapabilityRAT-Container field of the attach request.

The data indicating the at least one service requirement may comprise information on communication network optimizations needed by the terminal device.

The method may further comprise, in response to a detection that the first mobile communication network is not capable of providing the at least one service requirement indicated in the signal, a step of adjusting the at least one service requirement for a consecutive signal generated to at least one second mobile communication network. The adjustment of the at least one service requirement may comprise canceling at least one communication network optimization from the at least one service requirement.

According to a second aspect, a terminal device is provided, the terminal device comprising: at least one processor; at least one memory including computer program code; the at least one memory and the computer program code configured to, with the at least one processor, cause the terminal device to perform: generate, by the terminal device, a signal, in a context of a network attachment procedure, to a first mobile communication network, the signal is associated with data indicating at least one service requirement to the first mobile communication network; receive, by the terminal device, a response from the first mobile communication network, the response indicating a service capability of the first mobile communication network at least with respect to the at least one service requirement indicated in the data associated to the signal; in response to a detection that the first mobile communication network is not capable of providing the at least one service requirement indicated in the signal generate, by the terminal device, a signal, in a context of a network attachment procedure, to at least one second mobile communication network, the signal is associated with data indicating the at least one service requirement to the at least one second mobile communication network; receive, by the terminal device, a response from the at least one second mobile communication network, the response indicating a capability of the at least one second mobile communication network at least with respect to the at least one service requirement indicated in the data associated to the signal; and select, for attaching, the at least one second mobile communication network whose response is detected to indicate the service capability with respect to the at least one service requirement indicated in the data associated to the signal.

The terminal device may be configured to receive the signal into which data indicating the at least one service requirement is associated to in an attach request.

The terminal device may also be configured to perform the association of data by one of the following: including the data in the signal, indicating in the signal a referral to the data. The terminal device may be configured to include the data in the signal into an extension of a UE-CapabilityRAT-Container field of the attach request.

The terminal device may be configured to include in the data indicating the at least one service requirement information on communication network optimizations needed by the terminal device.

The terminal device may further be configured to, in response to a detection that the first mobile communication network is not capable of providing the at least one service requirement indicated in the signal, adjust the at least one service requirement for a consecutive signal generated to at least one second mobile communication network. Further, the terminal device may be configured to perform the adjustment of the at least one service requirement by canceling at least one communication network optimization value from the at least one service requirement.

According to a third aspect, a computer program product for selecting a mobile communication network service for a terminal device is provided which, when executed by at least one processor, cause a terminal device to perform the method as described above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically an example of a communication environment in which the present invention may be applied to.

DESCRIPTION OF THE EXEMPLIFYING EMBODIMENTS

The specific examples provided in the description given below should not be construed as limiting the scope and/or the applicability of the appended claims.

Lists and groups of examples provided in the description given below are not exhaustive unless otherwise explicitly stated.

Figure 1:
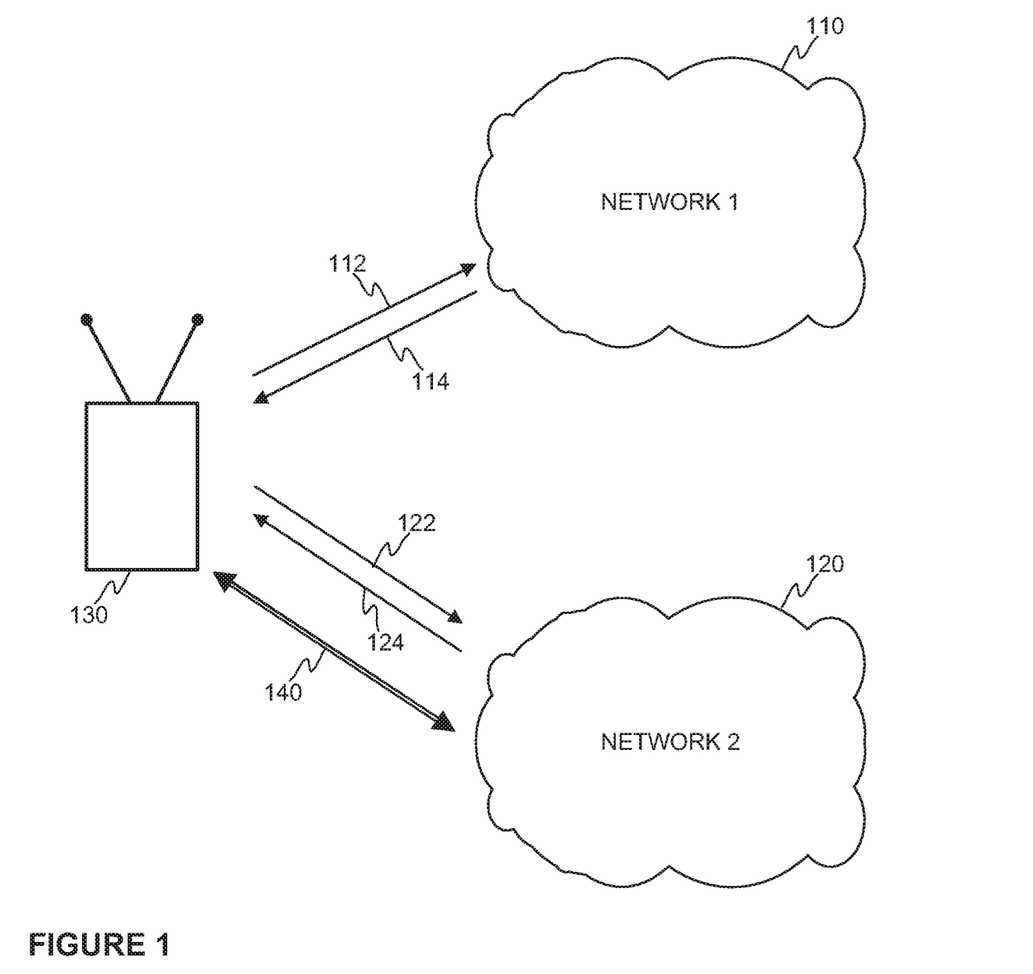

At least some aspects of a solution according to an embodiment of the invention are now described in a non-limiting communication environment as schematically illustrated in FIG. 1. The communication environment forming a system according to an embodiment of the invention may comprise a first communication network 110 and at least one second communication network 120. In other words, the communication environment may comprise further communication networks, which are not illustrated in FIG. 1 in order to describe at least some aspects of the invention in a simple communication environment. The communication networks 110, 120 may be operated by one or more telecom operators. The communication environment may also comprise a terminal device 130. The terminal device 130 is requesting an attachment to a communication network 110, 120 in a manner as will be described. In case the communication network 110, 120 requires a subscriber identity for accessing the network in question the terminal device 130 may be equipped with such. The subscriber identity may e.g. be implemented with a subscriber identity module (SIM) arranged in the terminal device 130. The subscriber identity module may e.g. refer to a hardware implementation with a smart card or a software implementation or any combined implementation.

Now, in order to find an optimal communication network 110, 120 for the terminal device 130, such as for a so-called IoT device, the terminal device 130 may be configured to exchange capability information with a communication network 110, 120 from which the terminal device 130 requests an attachment in order to receive a communication service from the communication network 110, 120 in question. In the non-limiting example as schematically illustrated in FIG. 1 the terminal device 130 may request attachment to the first communication network 110 with a signal 112. The signal 112 may be associated with a service requirement of the terminal device 130. An association of the service requirement with the signal 112 may refer to an implementation in which the signal 112 may carry capability information indicating at least some capabilities of the terminal device 130, such as the ones the terminal device 130 needs in performing its task when utilizing the communication service provided by the communication network 110, 120. Alternatively or in addition, the association of the service requirement may be implemented so that the communication network 110 may obtain the information on the service requirement of the terminal device 130 in response to a receipt of the signal 112. The obtaining of the information may e.g. be arranged with a separate signaling between the communication network 110 and the terminal device 130 or the piece of information may be obtained from a different network entity, such as from a data storage. For example, the terminal device 130 may indicate either directly or indirectly a network address of the data storage storing the information on the service requirement in the signal 112 requesting attachment to the first communication network 110. In response to a receipt of information on a service capability of the first communication network 110, i.e. at least one network node therein, may process the received information and inform the terminal device 130 on its capability to provide services (a signal 114 in FIG. 1) indicated by the terminal device 130. For example, the response i.e. the signal 114 may comprise an indication that the communication network 110 may or may not provide the inquired services. Additionally, a detailed information may be included in the signal 114 e.g. with respect to one or more service requirements requested in the signal 112.

Next, the terminal device 130 may be configured to determine if the information indicated with the response signal 114 fulfills the need of the terminal device 130 e.g. to perform its task. In case an outcome of the determination is that the first communication network 110 may provide the needed at least one capability, the terminal device 130 may complete an attachment procedure and start using the communication service of the first communication network 110 for the task defined for the terminal device 130. On the other hand, in case the outcome of the determination is that the first communication network 110 may not provide the needed at least one capability, the terminal device 130 may be configured, according to an embodiment of the invention, to initiate another attachment procedure with a second communication network 120 providing communication services in the area the terminal device 130 resides. Prior to the initiation of the attachment procedure to the second communication network 120 the terminal device 130 may be configured to, in at least some embodiment of the invention, inform the first communication network 110 by signaling (not illustrated in FIG. 1) that the terminal device 130 is not willing to use the communication service of the first communication network 110 and in that manner cancel the attachment procedure to the first communication network 110.

The above-mentioned initiation of the attachment procedure to the second communication network 120 may be achieved by generating a signal 122 requesting attachment to the second communication network 120. The signal 122 may correspond to the first signal 112 generated for requesting attachment to the first communication network 110. In other words, the signal 122 may be associated with information on a service requirement of the terminal device 130. An association of the service requirement with the signal 122 may refer to an implementation in which the signal 122 may carry capability information indicating at least some capabilities of the terminal device 130, such as the ones the terminal device 130 needs in performing its task when utilizing the communication service provided by the communication network 110, 120. Alternatively or in addition, the association of the service requirement may be implemented so that the second communication network 120 may obtain the information on the service requirement of the terminal device 130 in response to a receipt of the signal 122. The obtaining of the information may e.g. be arranged with a separate signaling between the second communication network 120 and the terminal device 130 or the piece of information may be obtained from a different network entity, such as from a data storage, with an inquiry. For example, the terminal device 130 may indicate either directly or indirectly a network address of the data storage storing the information on the service requirement in the signal 122 requesting attachment to the second communication network 120. In response to a receipt of the information on a service capability of the second communication network 120, i.e. at least one network node therein, may process the received information and inform the terminal device 130 on its capability to provide services (a signal 124 in FIG. 1) indicated by the terminal device 130. For example, the response i.e. the signal 124 may comprise an indication that the second communication network 110 may or may not provide the inquired services. Additionally, a detailed information may be included in the signal 124 e.g. with respect to one or more service requirements requested in the signal 122.

Now, the terminal device 130 may possess information on the service capability of the second communication network 120 with respect to the capability requirement of the terminal device 130. Based on the information the terminal device 130 may determine if the second communication network 130 fulfills the need of the terminal device 130 e.g. to perform its task. Here, it is assumed that the outcome of the determination by the terminal device 130 is that the second communication network 120 may provide the needed capabilities. In response to the positive determination the terminal device may complete the attachment procedure to the second communication network and in that manner start using the communication service of the first communication network 110 for the task defined for the terminal device 130. This is indicated with arrow referred with 140 in FIG. 1.

Naturally, it may turn out through the determination that the terminal device 130 does not receive required services either from the second communication network 120 which may cause the terminal device 130 to perform the same procedures with respect to the second communication network 120 as was described in the context of the attachment procedure to the first communication network. Furthermore, the terminal device 130 may be configured to continue the procedure to find an applicable communication network in the same manner by requesting attachment to a further communication network 110, 120.

Figure 2:
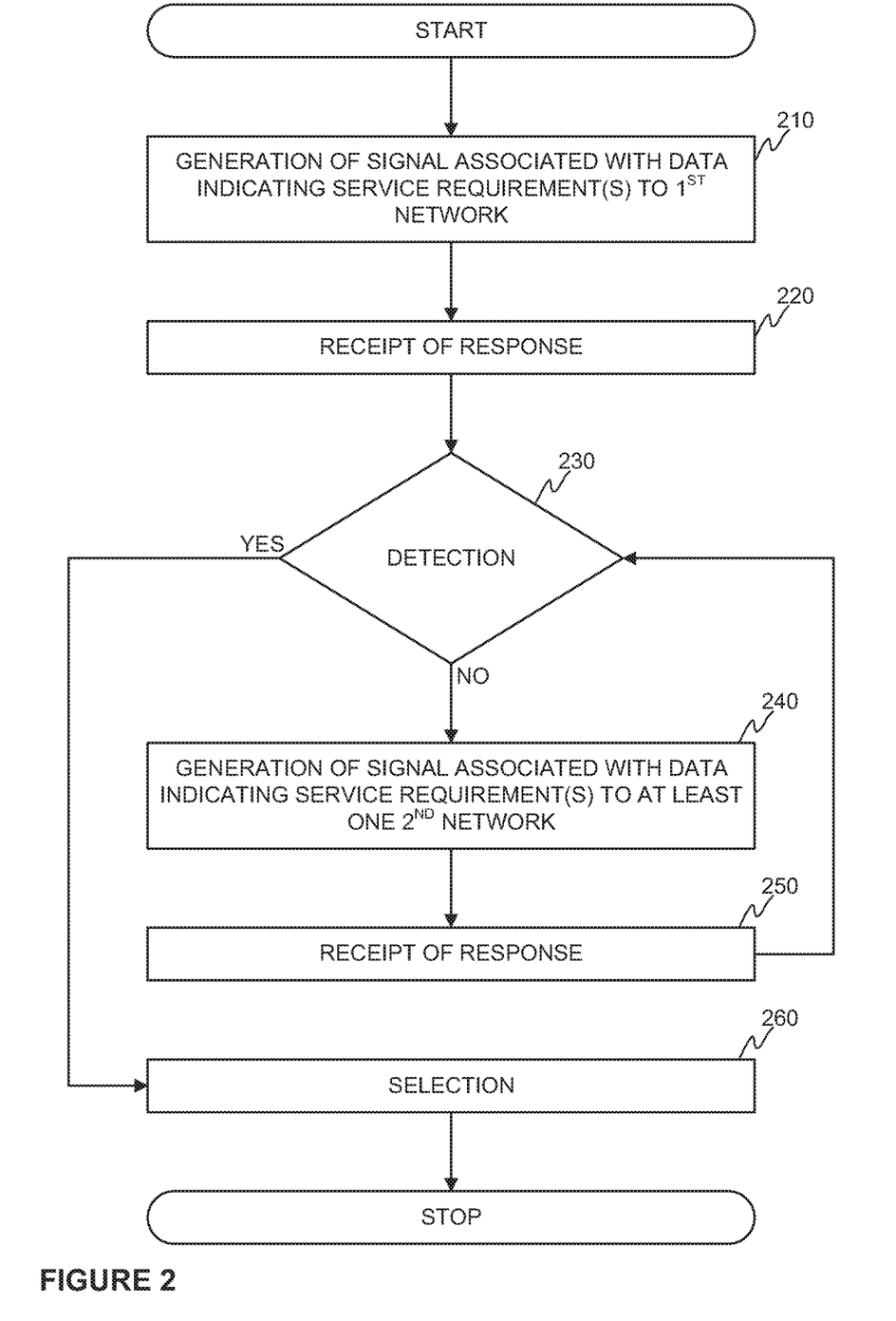
FIG. 2 illustrates schematically at least some aspects of a method according to an embodiment of the invention.

FIG. 2 illustrates schematically at least some aspects of a method according to an embodiment of the invention. The method may be initiated in response to a generation 210 of a signal requesting communication service from a first mobile communication network 110. The signal may e.g. refer to an attach request generated by the terminal device 130 to the first mobile communication network 110. The signal may be associated with data indicating at least one service requirement to the first mobile communication network 110. The first mobile communication network 110 may be configured to generate a response 114 received 220 by the terminal device 130 wherein the response may comprise information indicating a service capability of the first mobile communication network 110 with respect to the at least one service requirement indicated in the data associated to the signal 112. The terminal device 130 may be configured to detect 230, e.g. through a predetermined analysis procedure, if the first mobile communication network 110 may provide service or services required by the terminal device 130. In response to a detection that the first mobile communication network 110 may fulfill the service requirement(s) the terminal device 130 may complete the attachment procedure by selecting 260 the first mobile communication network to provide communication service and in that manner start using the communication services provided by it according to needs of the terminal device 130. On the other hand, if the detection indicates that the first mobile communication network 110 is not suitable for fulfilling the service requirements of the terminal device 130, the terminal device 130 may be configured to generate 240 a signal 122 to a second mobile communication network 120. The signal 122 may e.g. refer to an attach request generated by the terminal device 130 to the second mobile communication network 120. The signal may be associated with data indicating at least one service requirement to the second mobile communication network 110. The second mobile communication network 120 may be configured to generate a response 124 received 250 by the terminal device 130 wherein the response may comprise information indicating a service capability of the second mobile communication network 120 with respect to the at least one service requirement indicated in the data associated to the signal 122. Again, the terminal device 130 may be configured to detect 230, e.g. through a predetermined analysis procedure, if the second mobile communication network 120 may provide service or services required by the terminal device 130. In response to a detection that the second mobile communication network 120 may fulfill the service requirement(s) the terminal device 130 may complete the attachment procedure to the second mobile communication network 120 by selecting 260 the second communication network to provide communication service and start using the communication services provided by it according to needs of the terminal device 130. On the other hand, if the detection indicates that the second mobile communication network 120 is not either suitable for fulfilling the service requirements of the terminal device 130, the terminal device 130 may be configured to generate 240 a signal requesting service as described to a further mobile communication network. Hence, the method as schematically illustrated in FIG. 2 may be continued until a mobile communication network is found which fulfills the service requirement of the terminal device 130 in question.

As described the detection 230 in the mobile communication network 110, 120 in question fulfills at least one service requirement of the terminal device 130 may be based on an analysis of data in the response signal by the terminal device 130. This may refer to an implementation in which the data in the response comprises only an indication if the mobile communication network may fulfill the service requirement(s) or not, or alternatively a detailed analysis of the data disclosing all the service capabilities of the mobile communication network 110, 120. Naturally, the signal requesting the service from the mobile communication network 112, 122 may be adjusted according to the implementation of the procedure.

A determination of a capability of a mobile communication network 110, 120 may be performed so that the data associated with the signal 112, 122, wherein the data indicating at least one service requirement, may define communication network optimizations, e.g. as values, relevant to a particular terminal device 130 type. This may refer to, but is not limited to, a set of optimizations indicating features or functionalities the terminal device 130 needs from the mobile communication network 110, 120. For example, the terminal device 130 may indicate that it needs Power Saving Mode (PSM), Extended Discontinuous Reception (eDRX) and Non IP Data Delivery (NIDD) for operating in the communication network, messaging related indications, cell reselection related indications, Service Capability Exposure Function (SCEF), as non-limiting examples of the network optimizations. In addition to the communication network optimizations, the terminal device 130 may include further information on its needs in the data. For example, it may indicate further parameters for the communication network optimizations. Alternatively, the mobile communication network 110, 120 may provide the mentioned parameters in the response. An example of the additional parameters may be data indicating a duration of the power saving mode i.e. PSM timer values, such as values between 2 s-2000 s are recommended. Moreover, the additional parameters may define requirements for any other optimization value, such as to the Extended Discontinuous Reception (eDRX) (e.g. timer value shall be between 20 s-180 min), the Non IP Data Delivery (NIDD) (such as NIDD is supported or not), the messaging related indications (such as SMS supported or not), cell reselection related indications (such as cell reselection is supported or not), Service Capability Exposure Function (SCEF) (such as SCEF is supported or not) and so on. As a result, the terminal device 130 may perform an analysis if information included in the data matches with the service requirements of the terminal device 130.

The description above is based on a procedure in which the terminal device 130 searches a mobile communication network fulfilling it needs. According to another embodiment the terminal device 130 may be configured to, in response to a receipt of a response from at least one mobile communication network 110, 120, adjust data representing the service requirement(s), defined as the communication network optimization values, for any consecutive service request. For example, when requesting the communication service from the first mobile communication network 110, the mobile terminal may indicate all its service requirements to the first mobile communication network 110. In case the response is negative i.e. the first mobile communication network 110 is not capable of supporting all the requirements, the terminal device 130 may be configured to drop out at least one service requirement, e.g. one or more values of the communication network optimizations, from the request to the second communication network 120. The mobile terminal 130 may be configured to continue adjusting the service requirements accordingly. In the described manner the procedure to find a mobile communication network for providing the communication service to the terminal device 130 may be found in an efficient way.

Figure 3:
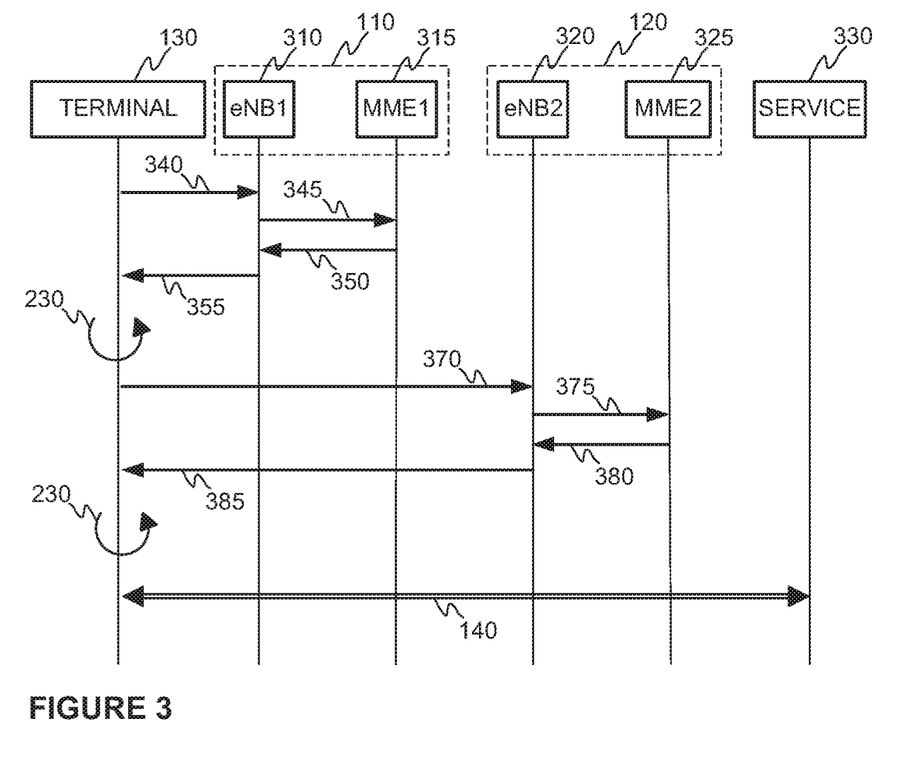
FIG. 3 illustrates schematically an example of signaling according to an embodiment of the invention.

The description provided above discloses that at least one mobile communication network 110, 120 is a party for selecting the mobile communication network to serve the terminal device 130. In FIG. 3 it is schematically illustrated in more detail at least some network entities being involved in the process when the mobile communication networks 110, 120 are LTE based networks. FIG. 3 also illustrates signaling between the network entities in more detail. In other words, a first and a second mobile communication network 110, 120 comprises network entities, such as network entities belonging to a radio access network (RAN) and to a core network (CN). In FIG. 3, the network entity belonging to RAN is eNodeB referred with 310 and 320. Further, the network entity belonging to CN is MME referred with 315 and 325 in FIG. 3. Now, the terminal device 130 configured to perform wireless communication requests attachment to a first mobile communication network 110 by generating a signal 340 to eNodeB1 310, which is configured to forward the signal 345, either as it is or by modifying it, to a network entity being responsible of managing access to the mobile communication network 110, 120 in question, which in this case is MME1 315. In the implementation of the present invention as depicted in FIG. 3 data indicating at least one service requirement to the first mobile communication network is associated to the signals 340 and 345. The MME1 generates a signal 350 carrying information on a capability of the first mobile communication network 110 to provide service fulfilling the at least one service requirement, which signal is forwarded, either as it is or by modifying it, by the eNodeB1 to the terminal device 130 with the mentioned information on a capability of the first mobile communication network 110. In the example of the signaling as illustrated in FIG. 3 the terminal device 130 may be configured to perform detection 230, e.g. by analyzing the received information. The outcome of the detection in the non-limiting example is that the first mobile communication network 110 is not capable of providing a communication service or services as indicated in the at least one service requirement and in response to such a detection the terminal device 130 may be configured to generate a signal 370 corresponding to the signal 340 to a network entity in a RAN, such as eNodeB2 320, of a second mobile communication network 120. The eNodeB2 320 may be configured to forward the signal 370, either as it is or by modifying it, to a network entity in a CN, such as MME2 325, of the second mobile communication network 120 as a signal 375. The MME2 325, or any corresponding network entity, may be configured on derive information from the signal 375 and to generate a response for indicating a capability of the second mobile communication network 120 to support one or more service requirements indicated in the data associated to the signal 370 and 375. The information on the capability is included in a response signal 380 is transmitted from the MME2 325 to eNodeB2 320, which is configured to forward it, either as it is or by modifying it, to the terminal device 130, which again performs a detection 230, e.g. by analyzing the received information. The outcome of the detection in the non-limiting example is that the second mobile communication network 120 is capable of providing the communication service or services as indicated in the at least one service requirement and in response to such a detection the terminal device 130 may be configured to complete the attachment procedure with the second mobile communication network 120 and start communicating 140 with a service entity, such as with a server 330. Generally speaking a network entity with which the terminal device 130 is configured to determine if a mobile communication network 110, 120 meets the at least one service requirement may be any which possesses, such as stores or may access, data indicating either directly or indirectly a capability of the mobile communication network 110, 120. Naturally, the term network entity may refer to a single device or a plurality of devices configured to operate in a distributed manner.

In a non-limiting example of the invention an applicable data field for associating the data in an attach request may be an extension to so called UE-CapabilityRAT-Container field. Alternatively or in addition, the data indicating at least one service requirement may be delivered in a dedicated container delivered distinct to the attachment phase. Such a container may be exchanged during a handshaking procedure in a similar manner as described.

Figure 4:
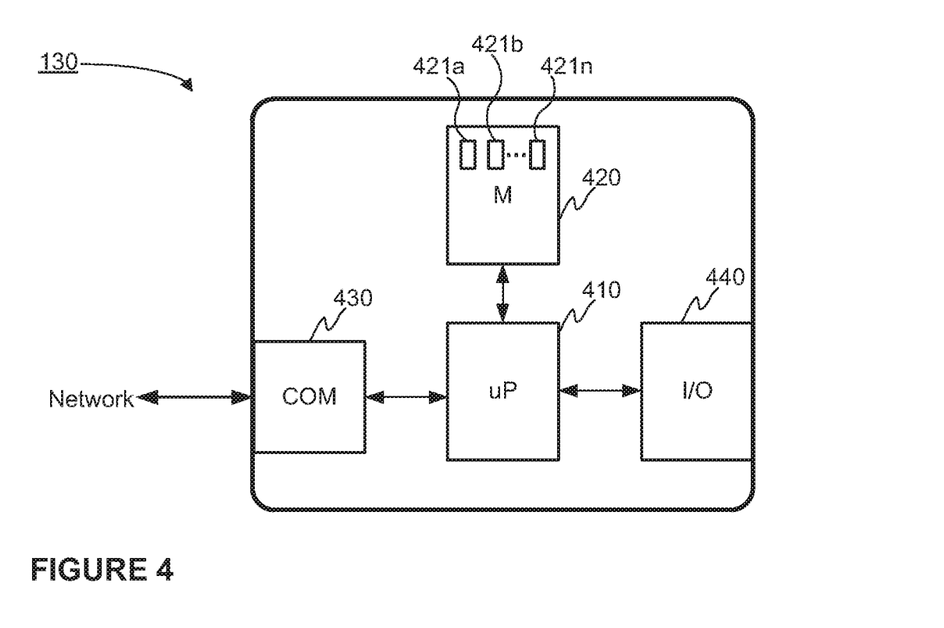
FIG. 4 illustrates schematically a terminal device according to an embodiment of the invention.

An example of a terminal device 130 according to the invention, which is suitable for implementing the method as described, is schematically illustrated in FIG. 4. The terminal device 130 may be configured to implement at least part of the method for managing a communication of the terminal device 130 in question as described. The execution of the method, or at least some portion of it, may be achieved by arranging a processor 410 to execute at least some portion of computer program code 421a-421n stored in a memory 420 causing the processor 410, and, thus, the terminal device 130 to implement one or more method steps as described. In other words, the processor 410 may be arranged to access the memory 420 and to retrieve and to store any information therefrom and thereto. Moreover, the processor 410 may be configured to control a communication through one or more communication interface 430 for accessing communication networks 110, 120 as described. Hence, the communication interfaces 430 may be arranged to implement, possibly under control of the processor 410, corresponding communication protocols, such as an IP, for communicating with one or more elements in the communication networks 110, 120. Further, the terminal device 130 in question may comprise one or more input/output devices 440 for inputting and outputting information. Such input/output devices may e.g. be keyboard, buttons, touch screen, display, loudspeaker, microphone camera and so on. In some implementation of the terminal device 130 at least some of the input/output devices may be external to the terminal device 130 and coupled to it either wirelessly or in a wired manner. For sake of clarity, the processor 410 herein refers to any unit or a plurality of units suitable for processing information and control the operation of the terminal device 130 in general at least in part, among other tasks. The mentioned operations may e.g. be implemented with a microcontroller solution with embedded software. Similarly, the invention is not limited to a certain type of memory 420, but any memory unit or a plurality of memory units suitable for storing the described pieces of information, such as portions of computer program code and/or parameters, may be applied in the context of the present invention.

Some aspects of the present invention may relate to a computer program product which, when executed by at least one processor, cause a terminal device to perform the method as described.

For sake of clarity it is worthwhile to mention that at least some aspects of an iterative solution for determining an optimal mobile communication network for a terminal device 130, such as an IoT device, is described above in a context wherein there are a plurality of separate mobile communication networks available to serve terminal devices within a certain location. However, the inventive concept of the present invention is not limited only to such an implementation, but it shall be understood to cover any solutions wherein one mobile communication network is operationally divided to separate parts which parts may provide different kind of services to terminal devices 130. This kind of approach is taken in a slice concept introduced e.g. in a context of 5G networks.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for selecting a mobile communication LTE network service for a terminal device, the method comprising:

generating, by the terminal device, a first signal, in a context of a LTE network attachment procedure, to a first mobile communication LTE network, the first signal being associated with data indicating at least one service requirement to be provided to the terminal device by the first mobile communication LTE network, the first mobile communication LTE network making a determination of whether the first mobile communication LTE network is capable to provide the at least one service requirement and generating a first response carrying information whether the first mobile communication LTE network is able to provide service fulfilling the at least one service requirement, receiving, by the terminal device, the first response from the first mobile communication LTE network, the first response comprising the information whether the first mobile communication LTE network has determined that the first mobile communication LTE network can provide to the terminal device the at least one service requirement indicated in the data associated to the first signal, in response to the information indicating that the first mobile communication LTE network is not capable of providing the at least one service requirement indicated in the first signal, the terminal device generating a second signal, in a context of the LTE network attachment procedure of the terminal device, to at least one second mobile communication LTE network, the second signal being associated with data indicating the at least one service requirement to be provided to the terminal device by the at least one second mobile communication LTE network, the second mobile communication LTE network making a determination of whether the second mobile communication LTE network is capable to provide the at least one service requirement and generating a second response carrying information whether the second mobile communication LTE network is able to provide service fulfilling the at least one service requirement, receiving, by the terminal device, the second response from the at least one second mobile communication LTE network, the second response comprising the information whether the at least one second mobile communication LTE network has determined that the second mobile communication LTE network can provide to the terminal device the at least one service requirement indicated in the data the second signal, based on the information carried by the second response indicating the service capability of the at least one second mobile communication LTE network being able to provide the at least one service requirement indicated in the data associated to the second signal, selecting, for attaching, the at least one second mobile communication LTE network, and attaching the terminal device to the at least one second mobile communication LTE network.

2. The method of claim 1, wherein the first signal and the second signal into which data indicating the at least one service requirement is associated are each an attach request.

3. The method of claim 1, wherein the association of data is performed by one of the following: including the data in the first and second signals, indicating in the first and second signals a referral to the data.

4. The method of claim 3, wherein the data is included in the first and second signals into an extension of a UE-CapabilityRAT-Container field of the attach request.

5. The method of claim 1, wherein the data indicating the at least one service requirement comprises information on communication network optimizations needed by the terminal device.

6. The method of claim 1, the method further comprises, in response to a detection that the first mobile communication network is not capable of providing the at least one service requirement indicated in the first signal, a step of adjusting the at least one service requirement for a consecutive signal generated to at least one second mobile communication LTE network.

7. The method of claim 6, wherein the adjustment of the at least one service requirement comprises canceling at least one communication network optimization from the at least one service requirement.

8. A terminal device comprising:
at least one processor; and
at least one memory including computer program code,
the at least one memory and the computer program code configured to, with the at least one processor, cause the terminal device to:
generate a first signal, in a context of a LTE network attachment procedure, to a first mobile communication LTE network, the first signal being associated with data indicating at least one service requirement to be provided to the terminal device by the first mobile communication LTE network,
receive a response from the first mobile communication LTE network having made a determination of whether the first mobile communication LTE network is capable to provide the at least one service requirement and, the response comprising information whether the first mobile communication LTE network has determined that the first mobile communication LTE network can provide to the terminal device the at least one service requirement indicated in the data associated to the first signal,
in response to the information indicating that the first mobile communication LTE network is not capable of providing the at least one service requirement indicated in the first signal, generate a second signal, in a context of the network attachment procedure of the terminal device, to at least one second mobile communication LTE network, the second signal being associated with data indicating the at least one service requirement to be provided to the terminal device by the at least one second mobile communication LTE network,
receive a response from the at least one second mobile communication LTE network having made a determination of whether the second mobile communication LTE network is capable to provide the at least one service requirement and, the response be provided to the terminal device including information whether the at least one second mobile communication LTE network has determined that the second mobile communication LTE network can provide to the terminal device the at least one service requirement indicated in the data associated to the second signal,
based on the information carried by the second response indicating the service capability of the at least one second mobile communication LTE network being able to provide the at least one service requirement indicated in the data associated to the second signal, select, for attaching, the at least one second mobile communication LTE network, and
attaching to the at least one second mobile communication LTE network.

9. The terminal device of claim 8, wherein the terminal device is configured to receive the first signal and the second signal into which data indicating the at least one service requirement are each associated to in an attach request.

10. The terminal device of claim 8, wherein the terminal device is configured to perform the association of data by one of the following: including the data in the first and second signals, indicating in the first and second signals a referral to the data.

11. The terminal device of claim 10, wherein the terminal device is configured to include the data in the first and second signals into an extension of a UE-CapabilityRAT-Container field of the attach request.

12. The terminal device of claim 8, wherein the terminal device is configured to include in the data indicating the at least one service requirement information on communication network optimizations needed by the terminal device.

13. The terminal device of claim 8, the terminal device is further configured to, in response to a detection that the first mobile communication LTE network is not capable of providing the at least one service requirement indicated in the first signal, adjust the at least one service requirement for a consecutive signal generated to at least one second mobile communication LTE network.

14. The terminal device of claim 13, wherein the terminal device is configured to perform the adjustment of the at least one service requirement by canceling at least one communication network optimization value from the at least one service requirement.

15. A non-transitory computer readable medium on which is stored a computer program for selecting a mobile communication LTE network service for a terminal device which, when executed by at least one processor, cause a terminal device (130) to:
  generate a first signal, in a context of a LTE network attachment procedure, to a first mobile communication LTE network, the first signal being associated with data indicating at least one service requirement to be provided to the terminal device by the first mobile communication LTE network,
  receive a response from the first mobile communication LTE network having made a determination of whether the first mobile communication LTE network is capable to provide the at least one service requirement and, the response comprising information whether the first mobile communication LTE network has determined that the first mobile communication LTE network can provide to the terminal device the at least one service requirement indicated in the data associated to the first signal,
  in response to the information indicating that the first mobile communication LTE network is not capable of providing the at least one service requirement indicated in the first signal, generate a second signal, in a context of the LTE network attachment procedure of the terminal device, to at least one second mobile communication LTE network, the second signal being associated with data indicating the at least one service requirement to be provided to the terminal device by the at least one second mobile communication LTE network,
  receive a response from the at least one second mobile communication LTE network having made a determination of whether the second mobile communication LTE network is capable to provide the at least one service requirement and, the response be provided to the terminal device including information whether the at least one second mobile communication LTE network has determined that the second mobile communication LTE network can provide to the terminal device the at least one service requirement indicated in the data associated to the second signal,
  based on the information carried by the second response indicating the service capability of the at least one second mobile communication LTE network being able to provide the at least one service requirement indicated in the data associated to the second signal, select, for attaching, the at least one second mobile communication LTE network, and
  attach the terminal device to the at least one second mobile communication LTE network.

* * * * *